United States Patent [19]

Tanaka et al.

[11] Patent Number: 4,894,817
[45] Date of Patent: Jan. 16, 1990

[54] METHOD OF WRITING DATA ON OPTICAL CARD BY PROJECTING THEREON INTENSITY MODULATED LIGHT BEAM

[75] Inventors: Hisakatsu Tanaka, Chofu; Takao Rokutan, Higashimurayama; Nagahiro Gocho, Hachioji, all of Japan

[73] Assignee: Olympus Optical Co., Ltd., Japan

[21] Appl. No.: 166,380

[22] Filed: Mar. 10, 1988

[30] Foreign Application Priority Data

Mar. 16, 1987 [JP] Japan ................................. 62-59068

[51] Int. Cl.$^4$ ..................... G11B 7/125; G06K 5/00; G06K 7/10
[52] U.S. Cl. ...................................... 369/54; 369/58; 369/116; 235/454; 235/438
[58] Field of Search ........................ 369/53, 54, 58, 59, 369/116, 121, 55, 118, 112, 117; 235/437, 438, 454, 455, 487, 488

[56] References Cited

U.S. PATENT DOCUMENTS

| 3,983,317 | 9/1976 | Glorioso | 369/116 |
|---|---|---|---|
| 4,488,277 | 12/1984 | McFarlane et al. | 369/116 |
| 4,538,257 | 8/1985 | Klinger | 369/116 |
| 4,571,716 | 2/1986 | Szerlip | 369/54 |
| 4,603,414 | 7/1986 | Ackerman et al. | 369/116 |
| 4,611,318 | 9/1986 | Winslow | 369/58 |
| 4,631,713 | 12/1986 | Romeas et al. | 369/116 |
| 4,680,456 | 7/1987 | Drexler | 235/454 |
| 4,685,097 | 8/1987 | van der Put | 369/116 |

FOREIGN PATENT DOCUMENTS

| 2573560 | 5/1986 | France. | |
|---|---|---|---|
| 59-154651 | 9/1984 | Japan | 369/54 |
| 61-16042 | 1/1986 | Japan | 369/116 |
| 2156978 | 10/1985 | United Kingdom. | |
| WO8501382 | 3/1985 | World Int. Prop. O. | 369/54 |

OTHER PUBLICATIONS

Patent Abstracts of Japan, vol. 11, No. 40 (P-544) [2487], 61-208671, Canon, Inc., Takehiko Shibata.

Primary Examiner—Alan Faber
Assistant Examiner—Robert A. Weinhardt
Attorney, Agent, or Firm—Arnold, White & Durkee

[57] ABSTRACT

A method of writing data in a track on a optical card by projecting a writing laser beam whose output power is modulated in accordance with the data to be recorded, wherein immediately after writing the data with the aid of the writing laser beam having a nominal value $A_3$, the data is read out of the optical card and confirmed whether the data has been correctly written or not. If the data is not correctly written on the optical card, the same data is written again in another track on the optical card with the aid of the writing laser beam whose output power is changed to a higher level $A_4$. Immediately after this second writing, the data is read out of the optical card to check whether the data has been correctly recorded or not. The data writing operation is repeated by a predetermined number of times by changing the level of the output power of the writing laser beam successively in the order of $A_3$, $A_4$, $A_2$, $A_5$, $A_1$, wherein $A_1 < A_2 < A_3 < A_4 < A_5$ and $A_3$ is the nominal level of the output power of writing laser beam.

14 Claims, 5 Drawing Sheets

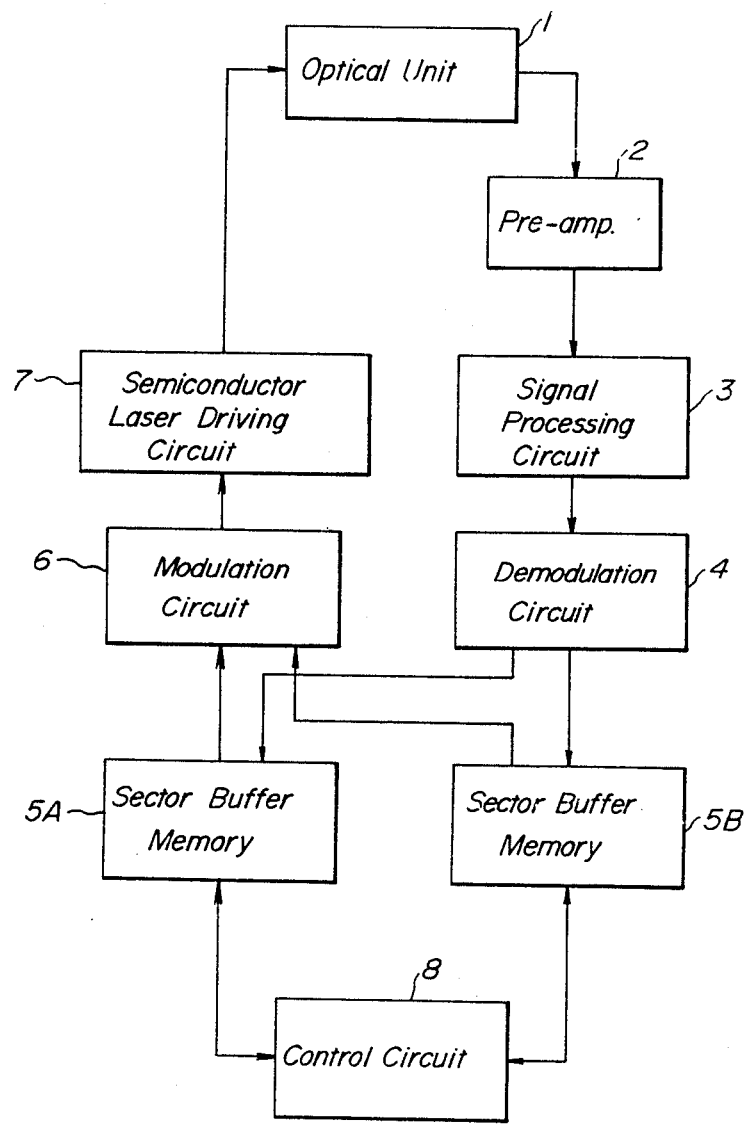
FIG_1
PRIOR ART

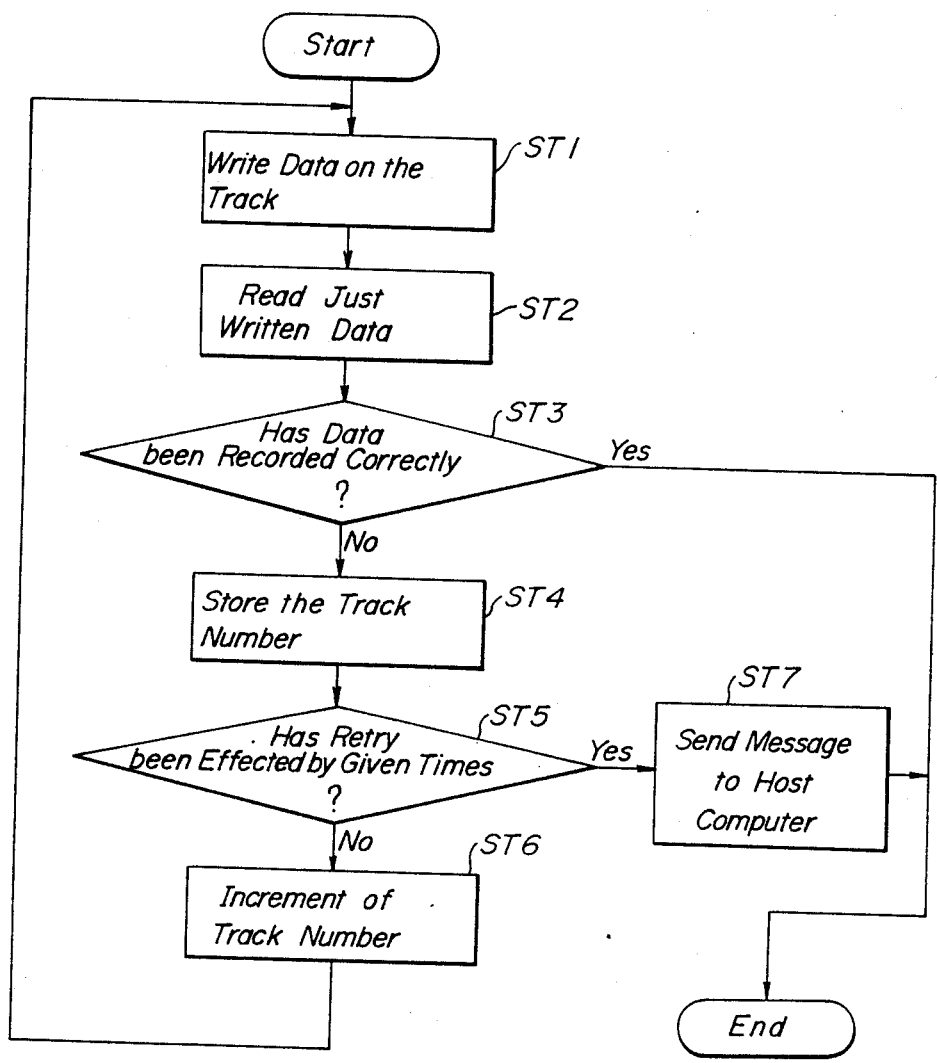
FIG_2
PRIOR ART

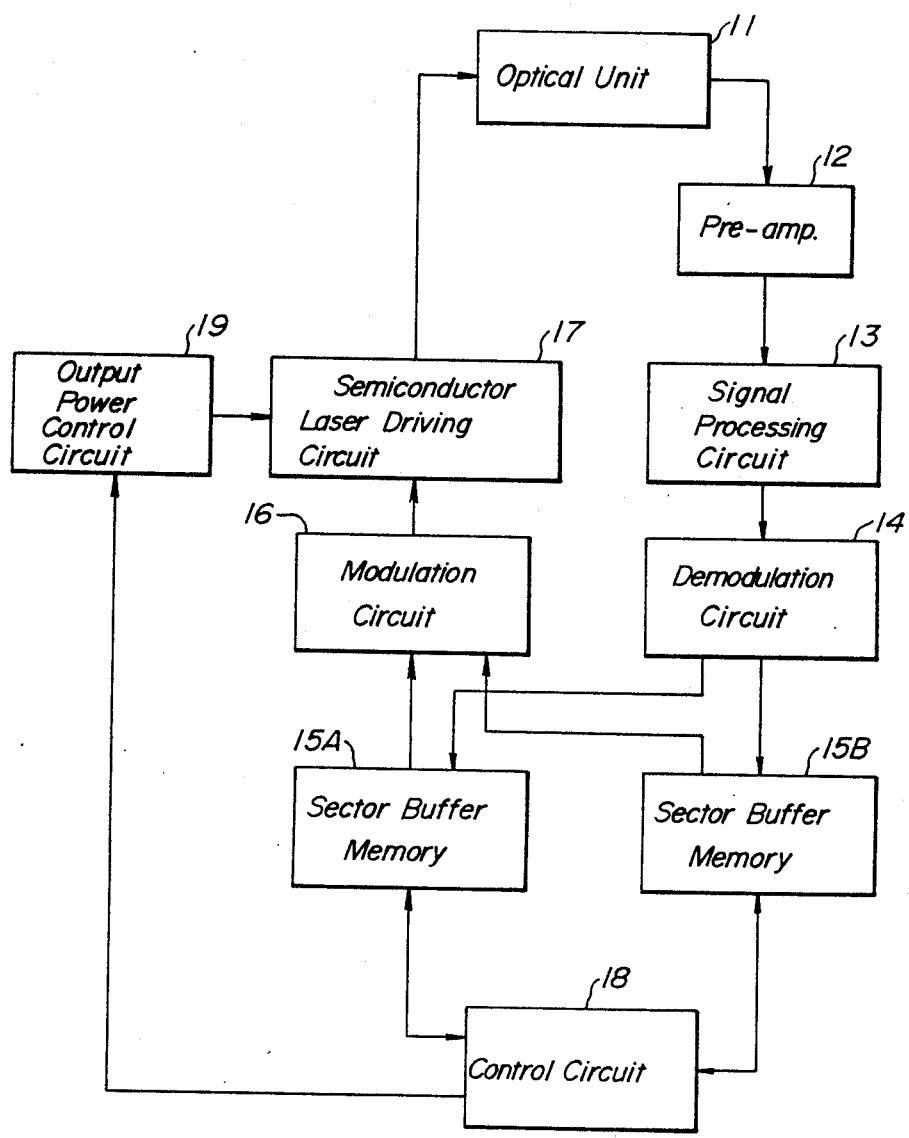
FIG_3

FIG_4
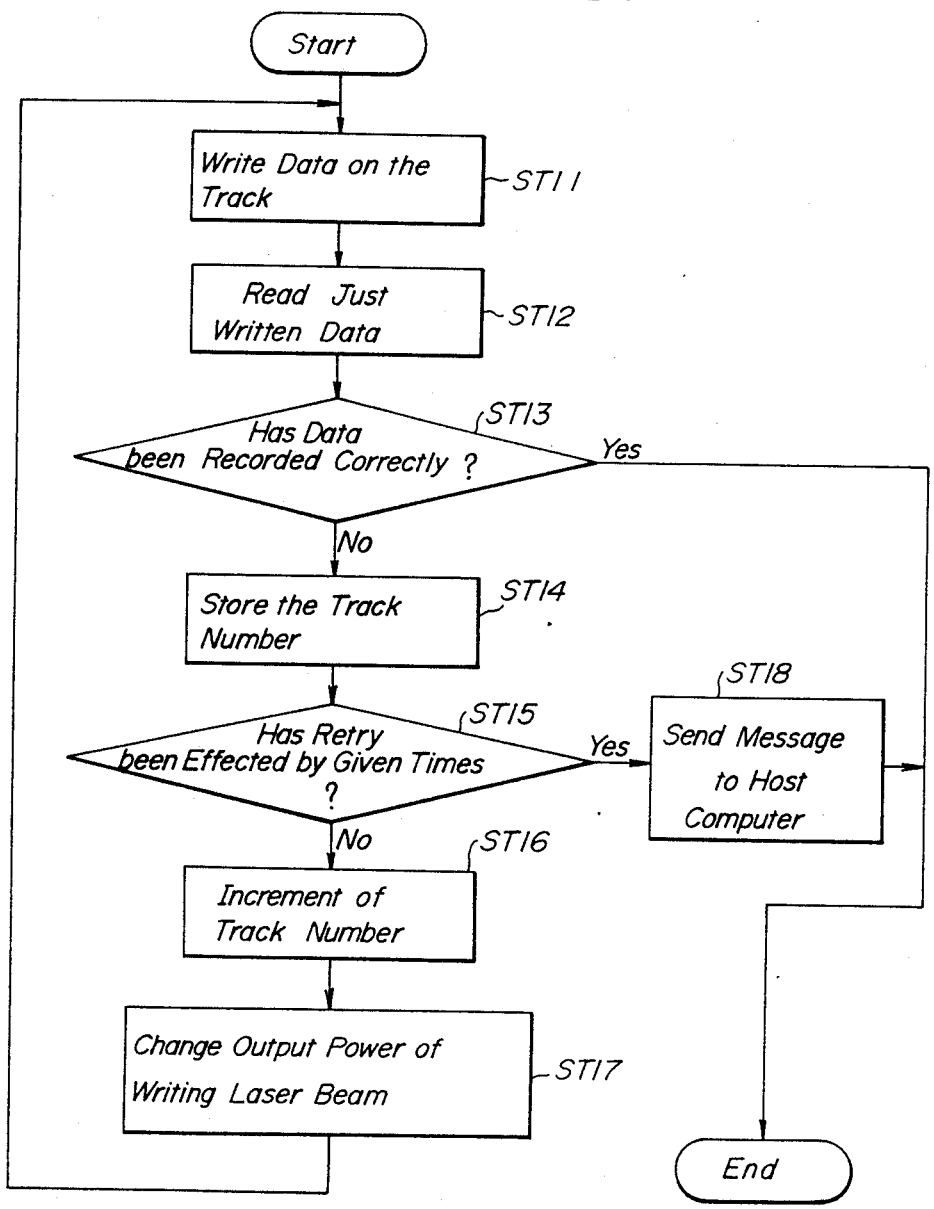

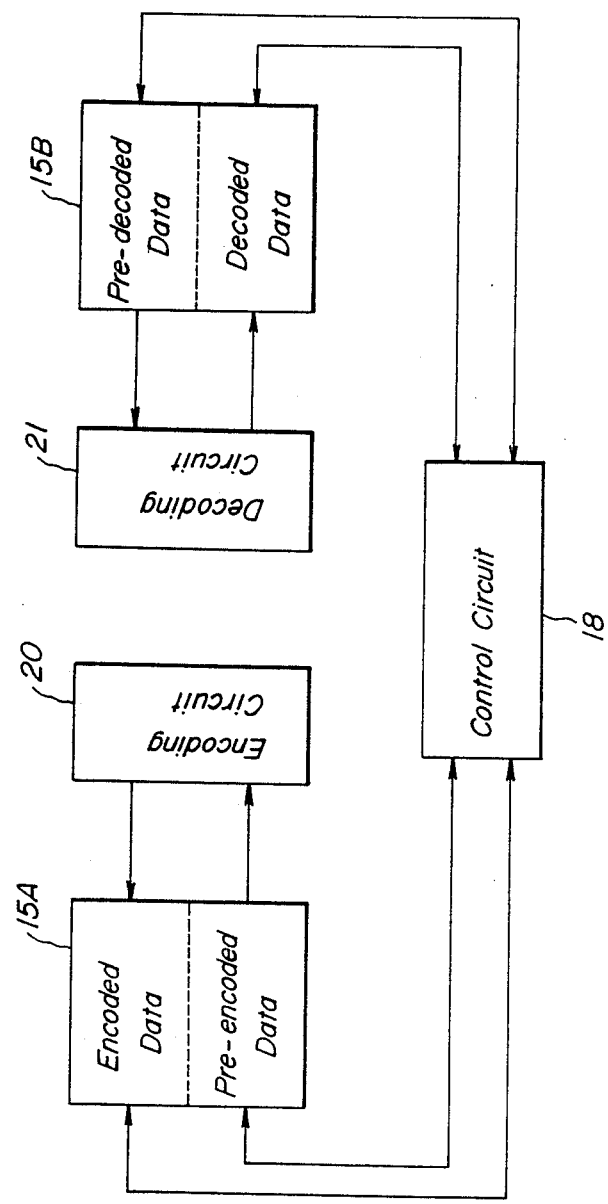

METHOD OF WRITING DATA ON OPTICAL CARD BY PROJECTING THEREON INTENSITY MODULATED LIGHT BEAM

BACKGROUND OF THE INVENTION

Field of the Invention and Related Art Statement

The present invention relates to a method of writing data on an optical card.

There have been proposed various types of data writing and reading apparatuses using optical cards of write-once-type. FIG. 1 is a block diagram showing schematically an example of the known writing and reading apparatus. The apparatus comprises an optical unit 1 which includes a semiconductor laser for emitting a data writing laser beam, a light emitting diode for emitting a data reading light beam, a light receiving element for receiving the data reading light beam modulated by data recorded on the optical card, an optical system for projecting the writing or reading beam onto the optical card and guiding the reading light beam reflected by the optical card onto the light receiving element, means for effecting focusing and tracking of the beams with respect to tracks on the optical card, and means for driving the optical system and optical card relative to each other. The optical unit 1 is well known in the relevant field of art and has been described in many publications, so that its detailed construction and operation may be dispensed with.

Now, the operation of the apparatus shown in FIG. 1 will be explained also with reference to a flow chart illustrated in FIG. 2.

Upon reading the data written on the optical card, an output signal supplied from the light receiving element in the optical unit 1 is amplified by a pre-amplifier 2 and then is converted into a bivalent signal in a signal processing circuit 3. The bivalent signal thus reproduced is supplied to a demodulation circuit 4 to demodulate the modulated data. The data thus demodulated is stored in a sector buffer memory 5B.

When writing the data on the optical card, the so-called read-after-write mode is adopted. Data to be written on the optical card is read out of a sector buffer memory 5A and is modulated in a modulation circuit 6. The modulation may be carried out by various methods. For instance, the data signal may be modulated in accordance with MFM (Modified Frequency Modulation). Then, the modulated data is supplied to a semiconductor laser driving circuit 7 to control an output current supplied from the driving circuit to the semiconductor laser in such a manner that the output power of the semiconductor laser provided in the optical unit 1 is changed to a writing level which is higher than a threshold level at which a record layer of the optical card becomes sensitive to light. In this manner, the data is written on the optical card (ST1). Immediately after the writing, the data which has been just recorded is read out of the optical card (ST2). The read out data is processed by the pre-amplifier 2, signal processing circuit 3 and demodulation circuit 4, and the demodulated data is stored in the sector buffer memory 5B. Then, the data stored in the sector buffer memory 5B is compared with the original data stored in the sector buffer memory 5A with the aid of the control circuit 8 to confirm whether the data has been written on the optical card correctly or not (ST3). When it is judged that the data has not been correctly recorded, the relevant track number is stored in the host computer (ST4), and after increasing the track number by one (ST6) to index a next track with respect to the optical unit, the same data is recorded again on the optical card in the next track. In this manner, the data writing operation is retried several times, while the output power of the semiconductor laser remains the same as that in the previous data writing operation. Then, the data thus recorded is reproduced to confirm the writing condition again. When the correct writing is not confirmed after a predetermined number of retries (ST5), the control circuit 8 sends to the host computer message announcing that the data writing has been failed (ST7).

The data writing method based on the above mentioned read-after-write mode has been disclosed in, for instance, Japanese Patent Publication Kokai 61-208,671.

Usually the optical cards are carried by users and the temperatures of the optical cards, particularly record layers of optical cards differ from each other. Further, the sensitivity of the record layers of optical cards might be different for respective cards. Therefore, even if the writing operation is repeated a predetermined number of times, while the output power of the semiconductor laser remains constant, the writing may not be performed correctly. This results in that the tracks on the optical card may not be utilized efficiently. In general, the record layer of an optical card is formed by a thin metal film and the laser beam is used to melt the metal film selectively in accordance with the data to be recorded to form openings in the metal film. The openings are generally called bits or pits and have optical properties different from that of the metal layer. Usually, the output power of the laser beam is set to such a value that the metal film at room temperature can be melted to form a pit having a predetermined dimension. When the temperature of the optical card is low, there might be formed in the metal film pits having smaller dimension than the predetermined dimension, and the pits might have a shorter length than the nominal value. On the contrary, when the temperature of the record layer of the optical card is high, the output power of the writing laser beam becomes too high to form pits or dots having the given dimension and the pits usually become longer than the nominal size. Usually, the data is written on the optical card in such a manner that the length of pits and/or the length of vacant spaces between successive pits is modulated in accordance with the modulated laser beam. Therefore, when the length of the pits is changed to extend beyond a given range of the length, it is no longer possible to recover the original data.

SUMMARY OF THE INVENTION

The object of the present invention is to provide a novel and useful method of writing data on an optical card, in which the data can be correctly and positively recorded regardless of the temperature and sensitivity of the record layer of optical card, so that the tracks on the optical card can be utilized with high efficiency.

According to the invention, a method of writing data on an optical card having a record layer on which a number of tracks are formed, by projecting a writing light beam whose output power is modulated in accordance with the data to be recorded, comprises the steps of:

writing the data in a track of the optical card with the aid of a light beam having a predetermined output power;

reading the data just written on the optical card to derive reproduced data;

checking the reproduced data to confirm whether the relevant data has been written on the optical card correctly or not; and repeating the writing of the relevant data in different tracks on the optical card, while the output power of the writing light beam is changed.

According to the method of the present invention, since the writing of the data is performed by changing the output power of the writing light beam, the data can be recorded on the optical card positively, and wasted tracks may be saved. It should be noted that the writing operation may be repeated a predetermined number of times.

BRIEF DESCRIPTION OF THE DRAWINGS

FIG. 1 is a block diagram showing the known data writing apparatus;

FIG. 2 is a flow chart illustrating the operation of the apparatus shown in FIG. 1;

FIG. 3 is a block diagram depicting an embodiment of the apparatus for effecting the data writing method according to the invention;

FIG. 4 is a flow chart showing the operation of the apparatus illustrated in FIG. 3; and FIG. 5 is a block diagram representing the detailed construction of sector buffer memories shown in FIG. 3.

DESCRIPTION OF THE PREFERRED EMBODIMENT

FIG. 3 is a block diagram showing an embodiment of the writing and reading apparatus for carrying out the method according to the invention. The apparatus comprises optical unit 11, pre-amplifier 12, signal processing circuit 13, demodulation circuit 14, sector buffer memories 15A, 15B, modulation circuit 16, semiconductor laser driving circuit 17, and control circuit 18. These elements are entirely the same as those of the known apparatus shown in FIG. 1 and thus the explanation of their operation is omitted here. According to the invention, the apparatus further comprises an output power control circuit 19 for controlling the output power of the writing laser beam emitted from the semiconductor laser provided in the optical unit 11. In the present embodiment, the output power of the writing laser beam can be changed in a stepwise manner and can be set to any one of five levels $A_1$–$A_5$ ($A_1 < A_2 < A_3 < A_4 < A_5$) in accordance with a predetermined program. Usually the output power of the laser beam is set to the medium level $A_3$ of, for instance, 4 mW and the first writing operation is carried out at this level $A_3$.

Now the writing operation of the apparatus shown in FIG. 3 will be explained also with reference to the flow chart illustrated in FIG. 4. Upon writing, the optical unit 1 and the optical card are moved relative to each other in the track direction. Data to be written on the optical card is read out of the sector buffer memory 15A and is modulated by the modulation circuit 16 in accordance with a suitable modulation method such as the MFM method.

The modulated data signal is supplied to the semiconductor laser driving circuit 17 to control the semiconductor laser in the optical unit 11. In the first writing operation, the output power control circuit 19 sends a command to the optical unit 11 such that the writing laser beam has the output power of the medium level $A_3$. In this manner, the data is written in a track on the optical card, while the laser beam having the output power of the level $A_3$ is made incident upon the optical card (ST11). Immediately after the writing, the relevant track is illuminated by a reading light beam emitted from a light source such as a light emitting diode provided in the optical unit to read the just recorded data out of the optical card (ST12). The data thus read out is amplified by the pre-amplifier 12 and is converted into a bivalent signal. The bivalent signal thus reproduced is demodulated by the demodulation circuit 14 and the demodulated data is transferred to the sector buffer memory 15B. Under the control of the control circuit 18, the contents stored in the sector buffer memories 15A and 15B are compared with each other to confirm whether the relevant data has been written on the optical card correctly or not (ST13).

When it is certified that the data has been written correctly, the writing operation is ended. But when the data is found not to be recorded correctly, the writing operation is repeated. In case of effecting the second writing operation, the track number in which the data has not been written correctly is stored in the host computer (ST14), and then the track number is increased by one (ST16). Then, the optical card and the optical system in the optical unit 11 are moved relative to each other such that the writing operation can be performed for a newly indexed track. Next, the control circuit 18 sends to the output power control circuit 19 a command denoting that the output power of the writing laser beam emitted from the semiconductor laser in the optical unit 11 has to be changed to the fourth level $A_4$ (ST17). The level $A_4$ is higher than $A_3$ by, for instance, 0.2 mW which corresponds to 5% of the nominal value of $A_3$. Then, the same data is written in the relevant track on the optical card with the laser beam having the output power of level $A_4$ (ST11). Immediately after the writing, the data is read out and is compared with the original data to confirm whether the writing has been done correctly or not. When the data has not been recorded correctly, the second retry is performed with the laser beam having the output power of second level $A_2$ which is lower than $A_3$ by 0.2 mW. The same operation is repeated, while the output power of the laser beam is changed to the levels $A_1$ and $A_5$, successively each time the track number is increased by one. The levels $A_1$ and $A_5$ are respectively lower and higher than $A_3$ by 0.4 mW. When the data is not recorded correctly by the fourth retry, it is judged that the data writing could not be effected (ST15) and a message announcing this fact is sent to the host computer (ST18). As explained above, according the invention, the same data is repeatedly written in different tracks on the optical card by changing the output power of the writing laser beam, so that the data can be accurately and positively written without being affected by the temperature and sensitivity of the record layer of optical card, while the wasted tracks can be saved materially.

The number of retries and the levels of the output power of the writing laser beam can be determined experimentally. Moreover the changing pattern of the levels is not limited to the above pattern of $A_3 \rightarrow A_4 \rightarrow A_2 \rightarrow A_5 \rightarrow A_1$, but may be modified in various ways. For instance, the output power of the writing laser beam may be changed in the succession of $A_3 \rightarrow A_2 \rightarrow A_4 \rightarrow A_1 \rightarrow A_5$; $A_1 \rightarrow A_2 \rightarrow A_3 \rightarrow A_4 \rightarrow A_5$; or $A_5 \rightarrow A_4 \rightarrow A_3 \rightarrow A_2 \rightarrow A_1$; while the level $A_3$ is the nominal value. It should be noted that the output power of the writing laser beam may be changed by controlling the amplitude or pulse width of driving current supplied to the semiconductor laser in the optical unit. The output power may be controlled with the aid of variable optical stop or ND (neutral density) filters.

Now the method of judging whether the data has been correctly recorded or not will be explained. As illustrated in FIG. 5 showing the detailed construction of the sector buffer memories 15A and 15B, the data to be recorded is supplied to the sector buffer memory 15A from the host computer and is encoded by an encoding circuit 20. Thus, in the sector buffer memory 15A there are stored both the encoded data and pre-encoded data. Further, the data read out of the optical card is also decoded by a decoding circuit 21, and thus in the sector buffer memory 15B there are stored both the decoded data and pre-decoded data. The decoded data is supplied to the host computer. Therefore, the confirmation of the correct writing can be performed by comparing coincidence of the encoded data stored in the memory 15A with the pre-decoded data stored in the memory 15B. When, the number of errors in the data exceeds a predetermined permissible number, it is judged that the data has not been recorded correctly on the optical card. The judgment may be carried out by comparing a length of error burst with a predetermined length of error burst or by checking whether the read out data can be correctly decoded by decoding circuit 21 or not. Moreover, the effectiveness of the judging may be increased by checking not only the error rate in the read out data, but also an amplitude of the reproduced signal and the pulse width.

As explained above in detail, in the data writing method according to the invention, since the writing operation is repeated by changing the output power of the writing laser beam, the data can be recorded positively, even if the temperature and sensitivity of the record layer of the optical card are different from nominal values, and thus the track area can be utilized efficiently without wasting a large track area.

We claim:

1. A method of writing data on an optical card having a record layer on which a number of tracks are formed, by projecting a writing light beam whose output power is modulated in accordance with the data to be recorded, comprising the steps of:
   (1) first writing the data in a track of the optical card with the aid of a light beam having a predetermined output power;
   (2) reading the data just written on the optical card to derive reproduced data;
   (3) checking the reproduced data to confirm whether the relevant data has been written on the optical card correctly or not;
   (4) upon confirming that the relevant data has not been correctly written on the card, changing the output power of the writing light beam in a stepwise manner;
   (5) repeating the writing of the relevant data in a different track on the optical card, after the output power of the writing light beam has been stepwise changed;
   (6) repeating steps (2), (3), (4) and (5) until a repetition of step (3) confirms that the relevant data has been correctly written on the optical card; and
   (7) subsequently recording data on an optical card using the same output power of the writing light beam as used in the last repetition of step (5) which confirmed that the relevant data had been correctly written on an optical card.

2. A method according to claim 1, wherein said output power of the writing light beam is changed by adjusting an intensity thereof.

3. A method according to claim 1, wherein said output power of the writing light beam is changed by adjusting a duration thereof.

4. A method according to claim 1 wherein said output power of the writing light beam is changed among five different levels $A_1$ to $A_5$, $A_1 < A_2 < A_3 < A_4 < A_5$ and the middle level $A_3$ being equal to a nominal level.

5. A method according to claim 4, wherein said output power of the writing light beam is changed successively in the order of $A_3$, $A_4$, $A_2$, $A_5$ and $A_1$.

6. A method according to claim 4, wherein said output power of the writing light beam is ;changed successively in the order of $A_3$, $A_2$, $A_4$, $A_1$ and $A_5$.

7. A method according to claim 4, wherein said output power of the writing light beam is changed successively in the order of $A_1$, $A_2$, $A_3$, $A_4$ and $A_5$.

8. A method according to claim 4, wherein said output power of the writing light beam is changed successively in the order of $A_5$, $A_4$, $A_3$, $A_2$ and $A_1$.

9. A method according to claim 1, wherein said writing step comprises
   storing original data in a first sector buffer memory;
   encoding the original data read out of the first sector buffer memory to generate encoded original data;
   modulating the encoded original data to generate modulated original data; and
   modulating the output power of the writing light beam in accordance with the modulated original data; and said reading step includes
   photoelectrically converting light modulated by the data written on the optical card to reproduce modulated reproduction data;
   demodulating the modulated reproduction data to reproduce encoded reproduction data;
   decoding the encoded reproduction data to reproduce reproduction data; and
   storing the reproduction data in a second sector buffer memory.

10. A method according to claim 9, wherein said checking step comprises a step of comparing the original data stored in the first sector buffer memory and the reproduction data stored in the second sector buffer memory with each other.

11. A method according to claim 9, wherein said checking step includes a step of comparing the encoded original data with the encoded reproduction data with each other.

12. A method according to claim 10, wherein the checking step further comprises a step of checking an error rate.

13. A method according to claim 10, wherein the checking step further comprises a step of checking a length of error burst.

14. A method according to claim 9, wherein said checking step comprises a step of confirming whether the decoding can be effected properly or not.

* * * * *